(12) United States Patent
Wallman et al.

(10) Patent No.: US 7,197,750 B2
(45) Date of Patent: Mar. 27, 2007

(54) JAVA BYTECODE INSTRUCTION FOR DETERMINING HASHCODE VALUES

(75) Inventors: David Wallman, Sunnyvale, CA (US); Stepan Sokolov, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 779 days.

(21) Appl. No.: 09/896,016

(22) Filed: Jun. 28, 2001

(65) Prior Publication Data

US 2003/0005170 A1    Jan. 2, 2003

(51) Int. Cl.
*G06F 15/163* (2006.01)
(52) U.S. Cl. ...................................... 719/310; 717/118
(58) Field of Classification Search ................ 717/118; 719/310
See application file for complete search history.

(56) References Cited

U.S. PATENT DOCUMENTS

| 6,061,520 A | * | 5/2000 | Yellin et al. ................. 717/148 |
| 6,192,517 B1 | * | 2/2001 | Agesen et al. ............... 717/154 |
| 6,643,842 B2 | * | 11/2003 | Angel et al. ................. 717/130 |

OTHER PUBLICATIONS

Angel David, Byte code instrumentation, Aug. 24, 2000, WO 00/49502 A1.*

Kyle R. Bowers, Characterizing the SPEC JVM98 Benchmarks On the Java Virtual Machine, Apr. 1999.*
Marius Gafen, Java on Embedded System, 1998.*
Bill Venners, Bytecode Basics, 1996.*
Lindholm et al., "The Java™ Virtual Machine Specification," (Sep., 1996), Sun Microsystems, Inc., Chapters 1-10 (173 pp.).

* cited by examiner

*Primary Examiner*—Meng-Al T. An
*Assistant Examiner*—LeChi Truong
(74) *Attorney, Agent, or Firm*—Beyer Weaver & Thomas, LLP

(57) ABSTRACT

Improved techniques for determining Java hashcode values for Java objects are disclosed. The techniques can be implemented to use a new Java Bytecode instruction which is suitable for execution by a Java virtual machine. As such, the new Java Bytecode instruction can be executed to determine Java hashcode value. Moreover, as will be appreciated, the Java hashcode values can be determined without invoking the Java method which is conventionally used to determine hashcode values. This means that the costly overhead associated with repeatedly invoking Java methods is avoided. In other words, operations that are conventionally performed each time this method is invoked need not be performed. As a result, the performance of virtual machines, especially those operating with limited resources (e.g., embedded systems), can be improved.

15 Claims, 5 Drawing Sheets

JAVA BYTECODE INSTRUCTION FOR DETERMINING HASHCODE VALUES

BACKGROUND OF THE INVENTION

The present invention relates generally to Java programming environments, and more particularly, to techniques suitable for determining hashcode values associated with Java objects.

One of the goals of high level languages is to provide a portable programming environment such that the computer programs may easily be ported to another computer platform. High level languages such as "C" provide a level of abstraction from the underlying computer architecture and their success is well evidenced from the fact that most computer applications are now written in a high level language.

Portability has been taken to new heights with the advent of the World Wide Web ("the Web") which is an interface protocol for the Internet which allows communication between diverse computer platforms through a graphical interface. Computers communicating over the Web are able to download and execute small applications called applets. Given that applets may be executed on a diverse assortment of computer platforms, the applets are typically executed by a Java virtual machine.

Recently, the Java programming environment has become quite popular. The Java programming language is a language that is designed to be portable enough to be executed on a wide range of computers ranging from small devices (e.g., pagers, cell phones and smart cards) up to supercomputers. Computer programs written in the Java programming language (and other languages) may be compiled into Java Bytecode instructions that are suitable for execution by a Java virtual machine implementation. The Java virtual machine is commonly implemented in software by means of an interpreter for the Java virtual machine instruction set but, in general, may be software, hardware, or both. A particular Java virtual machine implementation and corresponding support libraries together constitute a Java runtime environment.

Computer programs in the Java programming language are arranged in one or more classes or interfaces (referred to herein jointly as classes or class files). Such programs are generally platform, i.e., hardware and operating system, independent. As such, these computer programs may be executed without modification on any computer that is able to run an implementation of the Java runtime environment.

Object-oriented classes written in the Java programming language are compiled to a particular binary format called the "class file format." The class file includes various components associated with a single class. These components can be, for example, methods and/or interfaces associated with the class. In addition, the class file format can include a significant amount of ancillary information that is associated with the class. The class file format (as well as the general operation of the Java virtual machine) is described in some detail in *The Java Virtual Machine Specification, Second Edition*, by Tim Lindholm and Frank Yellin, which is hereby incorporated herein by reference.

FIG. 1A shows a progression of a simple piece of a Java source code 101 through execution by an interpreter, the Java virtual machine. The Java source code 101 includes the classic Hello World program written in Java. The source code is then input into a Bytecode compiler 103 that compiles the source code into Bytecodes. The Bytecodes are virtual machine instructions as they will be executed by a software emulated computer. Typically, virtual machine instructions are generic (i.e., not designed for any specific microprocessor or computer architecture) but this is not required. The Bytecode compiler outputs a Java class file 105 that includes the Bytecodes for the Java program. The Java class file is input into a Java virtual machine 107. The Java virtual machine is an interpreter that decodes and executes the Bytecodes in the Java class file. The Java virtual machine is an interpreter, but is commonly referred to as a virtual machine as it emulates a microprocessor or computer architecture in software (e.g., the microprocessor or computer architecture may not exist in hardware).

FIG. 1B illustrates a simplified class file 100. As shown in FIG. 1B, the class file 100 includes a constant pool 102 portion, interfaces portion 104, fields portion 106, methods portion 108, and attributes portion 110. The methods portion 108 can include or have references to several Java methods associated with the Java class which is represented in the class file 100.

As is known in the art, Java objects can be uniquely identified by a hashcode value. During the execution of Java programs, there is often a need to determine hashcode values for Java objects. Conventionally, the Java method "/java/lang/object.hashcode" is invoked by the virtual machine to determine these hashcode values. One problem with this approach is that there is an overhead associated with the invocation of a Java method. In other words, Java method invocation requires several operations to be performed. These operations include: locating the appropriate method to be invoked, creating a frame to be placed on the execution stack, and restoring the previous frame on the stack.

Moreover, the cost associated with determining hashcode values is quite high, since the Java method has to be invoked time and time again. In other words, the operations needed to invoke a method have to be performed several times during the execution of a Java program. This, of course, can result in a grossly inefficient use of system resources. In some circumstances, particularly in systems with limited computing power and/or memory, this inefficient use of resources is a serious disadvantage.

In view of the foregoing, there is a need for improved techniques to determine Java hashcode values which are used to identify Java objects.

SUMMARY OF THE INVENTION

Broadly speaking, the invention relates to improved techniques for determining Java hashcode values for Java objects. In accordance with one aspect of the invention, an inventive Java Bytecode instruction suitable for execution by a Java virtual machine is disclosed. As such, the inventive Java Bytecode instruction can be executed to determine Java hashcode value. Moreover, as will be appreciated, the Java hashcode values can be determined without invoking the Java hashcode method conventionally used to determine hashcode values. This means that the costly overhead associated with repeatedly invoking Java hashcode method is avoided. In other words, operations that are conventionally performed each time the Java hashcode method is invoked need not be performed. As a result, the performance of virtual machines, especially those operating with limited resources (e.g., embedded systems) can be improved.

The invention can be implemented in numerous ways, including as a method, an apparatus, a computer readable medium, and a database system. Several embodiments of the invention are discussed below.

As a Java Bytecode instruction suitable for execution by a Java virtual machine in the Java computing environment, one embodiment of the invention operates to determine a hashcode value for a Java object, thereby allowing the hashcode value to be determined without invoking the Java hashcode method. The Java Bytecode instruction can be executed by a virtual machine which operates to pop a reference to a Java object from the top of an execution stack; calculate a hashcode for the Java object value by accessing the Java object; and push the hashcode on top of the execution stack.

As a Java virtual machine operating in a Java computing environment, one embodiment of the invention provides a Java virtual machine capable of determining hashcode values for Java objects without invoking the Java hashcode method. The Java virtual machine executes an inventive Java Bytecode instruction to determine hashcode values for Java objects, thereby allowing hashcode values to be determined without invoking the Java hashcode method.

As a method of determining hashcode values for Java objects, one embodiment of the invention receives a Java Bytecode instruction in a stream of Java Bytecodes suitable for execution by a virtual machine operating in a Java computing environment. The Java Bytecode instruction is designated as a hashcode Java Bytecode instruction which allows hashcode values for Java objects to be determined without invoking a Java hashcode method. The method can also include the acts of: popping a reference to a Java object from an execution stack; calculating a hashcode value for the Java object by accessing the Java object; and pushing the hashcode on the execution stack.

As a computer readable media including computer program code for determining hashcode values for Java objects, one embodiment of the invention includes: computer program code for receiving a Java Bytecode instruction in a stream of Java Bytecodes suitable for execution by a virtual machine operating in a Java computing environment. The Java Bytecode instruction is designated as a hashcode instruction which allows hashcode values for Java objects to be determined without invoking a Java hashcode method.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The present invention pertains to improved techniques for determining Java hashcode values for Java objects. In accordance with one aspect of the invention, an inventive Java Bytecode instruction suitable for execution by a Java virtual machine is disclosed. As such, the inventive Java Bytecode instruction can be executed to determine Java hashcode value. Moreover, as will be appreciated, the Java hashcode values can be determined without invoking the Java hashcode method conventionally used to determine hashcode values. This means that the costly overhead associated with repeatedly invoking Java hashcode method is avoided. In other words, operations that are conventionally performed each time the Java hashcode method is invoked need not be performed. As a result, the performance of virtual machines, especially those operating with limited resources (e.g., embedded systems) can be improved.

Embodiments of the invention are discussed below with reference to FIGS. 2A–3. However, those skilled in the art will readily appreciate that the detailed description given herein with respect to these figures is for explanatory purposes only as the invention extends beyond these limited embodiments.

Figure 1A:
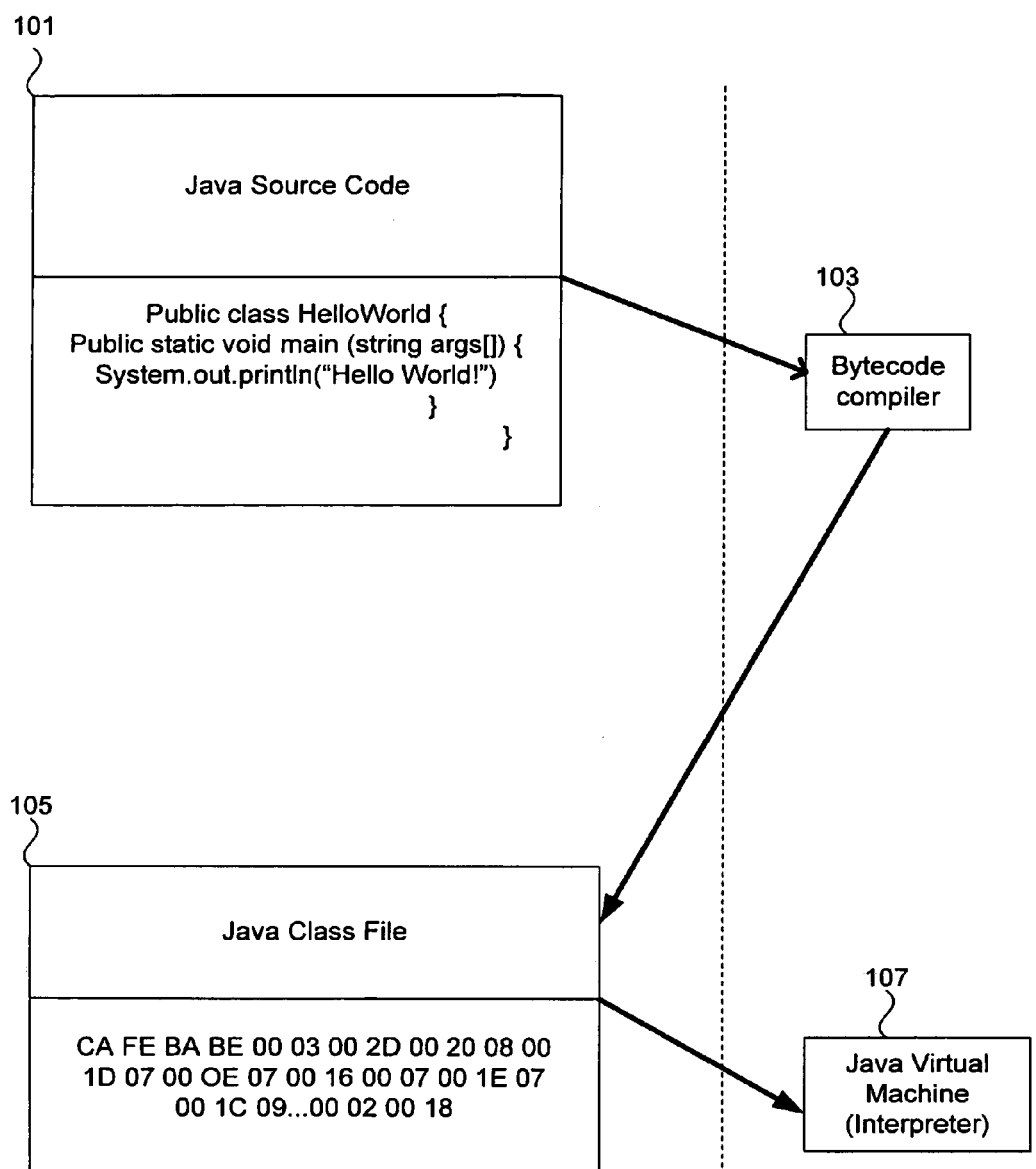
FIG. 1A shows a progression of a simple piece of a Java source code through execution by an interpreter, the Java virtual machine.
Figure 1B:
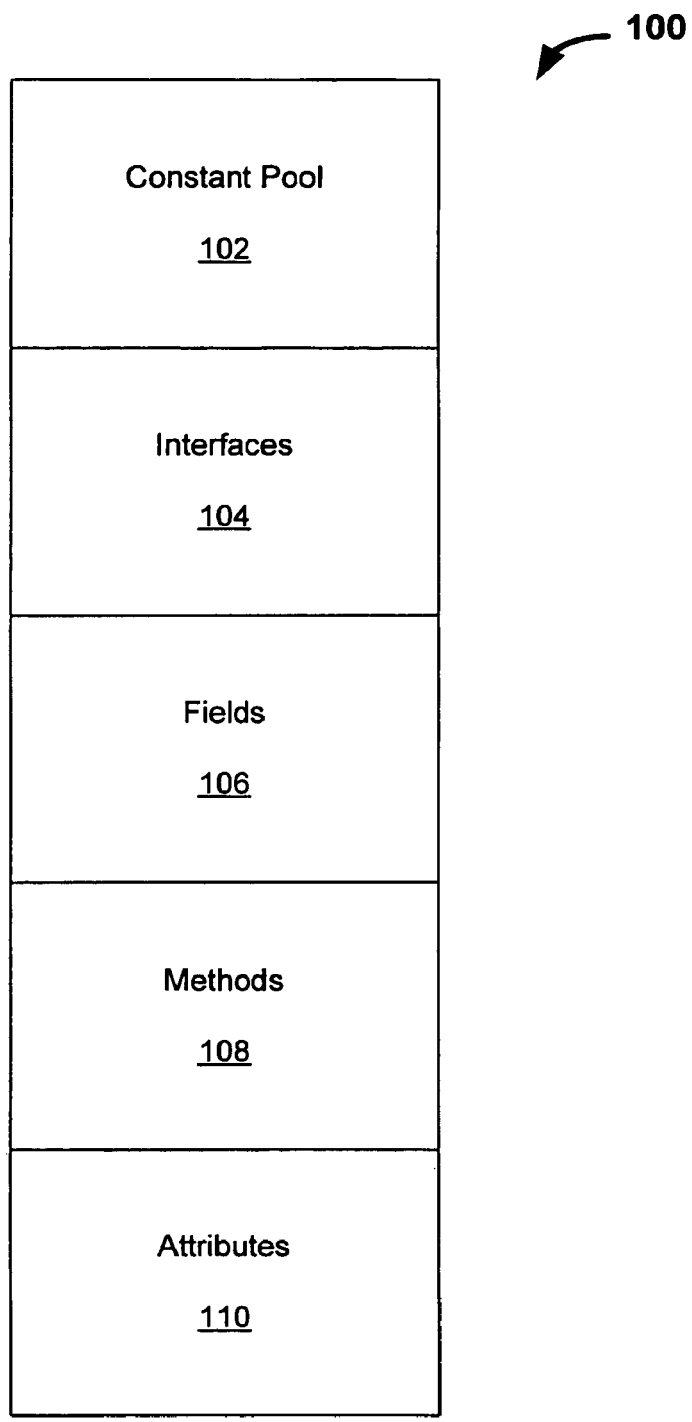
FIG. 1B illustrates a simplified class file.
Figure 2A:
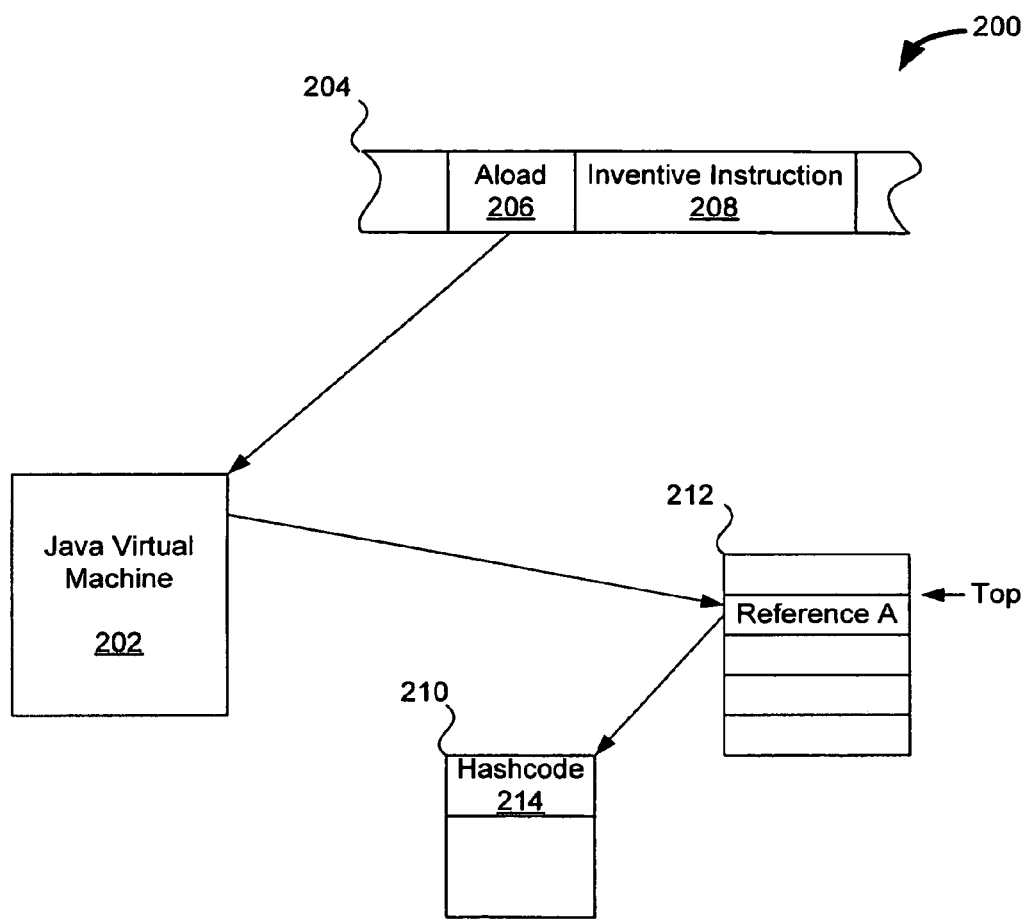
FIGS. 2A–2B illustrate a Java computing environment in accordance with one embodiment of the invention.
Figure 2B:
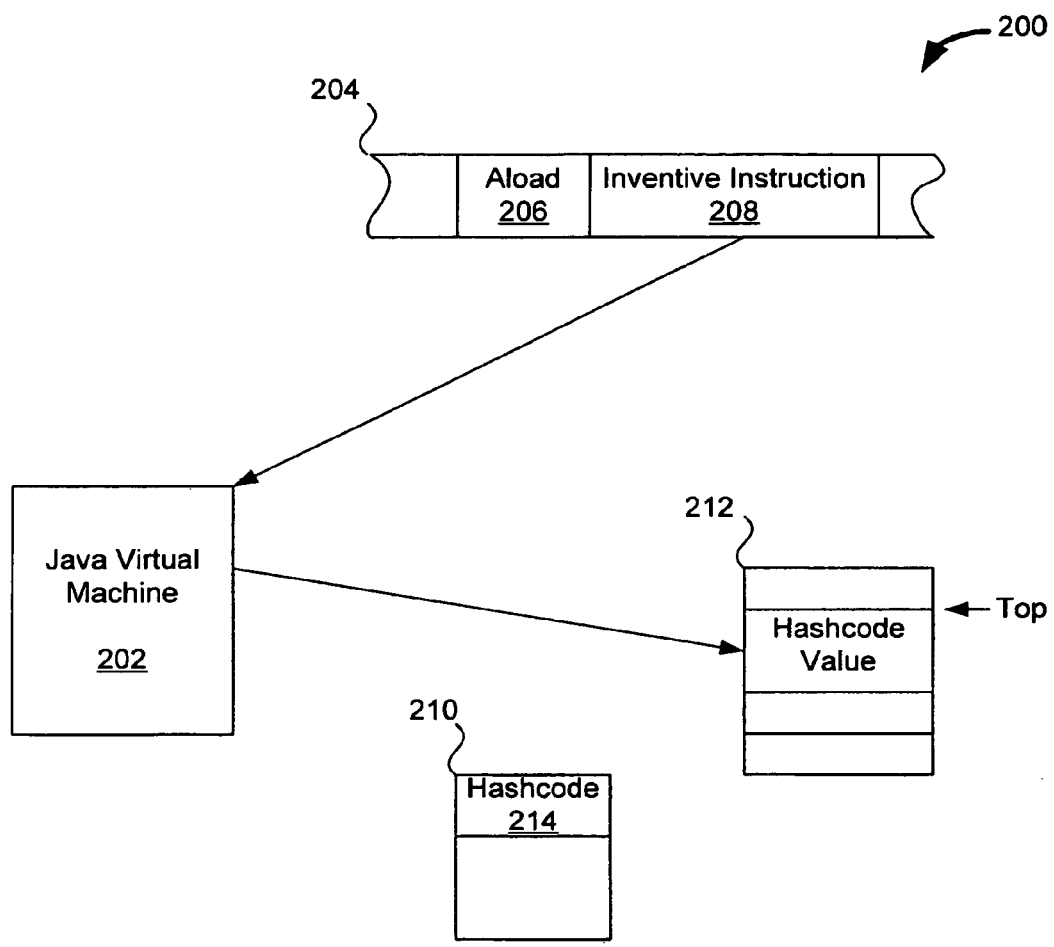

FIGS. 2A–B illustrate a Java computing environment 200 in accordance with one embodiment of the invention. A virtual machine 202 in the Java computing environment 200 receives a stream of Java Bytecodes 204 including a Java Aload Bytecode instruction 206 and an inventive Java Bytecode 208. The Aload Bytecode instruction 206 can be implemented as a conventional Java Bytecode instruction which operates to push a reference A to a Java object 210 on an execution stack 212.

The inventive Java Bytecode 208 is a Java Bytecode instruction that has been specifically designated for determining hashcode values for Java objects. As will be appreciated, the inventive Java Bytecode instruction set can be implemented as a new instruction that is added to the conventional Java Bytecode instruction set. This is possible because the conventional Java Bytecode instruction set does not typically use all the 256 possible values that can be coded by one byte (8 bits). As such, the inventive Java Bytecode instruction set can be assigned a unique 8 bit value that is not used for any conventional Java Bytecode instructions.

Referring now to FIG. 2B, the virtual machine 202 operates to receive the inventive Java Bytecode instruction 208. When the inventive Java Bytecode instruction 208 is executed, the hashcode value of the Java object is determined. In the simplest case, this determination can be made by reading a hashcode field 214 of the Java object 210 which contains the hashcode value. Alternatively, this determination can operate to calculate the hashcode value for the Java object 210. In any case, after the hashcode value has been determined, the virtual machine 202 operates to push the hashcode value on the execution stack 212. It should be noted that the virtual machine 202 also operates to pop the reference A from the execution stack 212 before pushing the hashcode value on the execution stack 212.

Accordingly, the inventive Java Bytecode instruction 208 can be used to determine hashcode values for Java objects. Moreover, the hashcode value can be determined without invoking a Java method. This means that costly overhead associated with invoking Java methods can be avoided. As a result, the performance of virtual machines, especially those operating with limited resources, can be improved.

Figure 3:
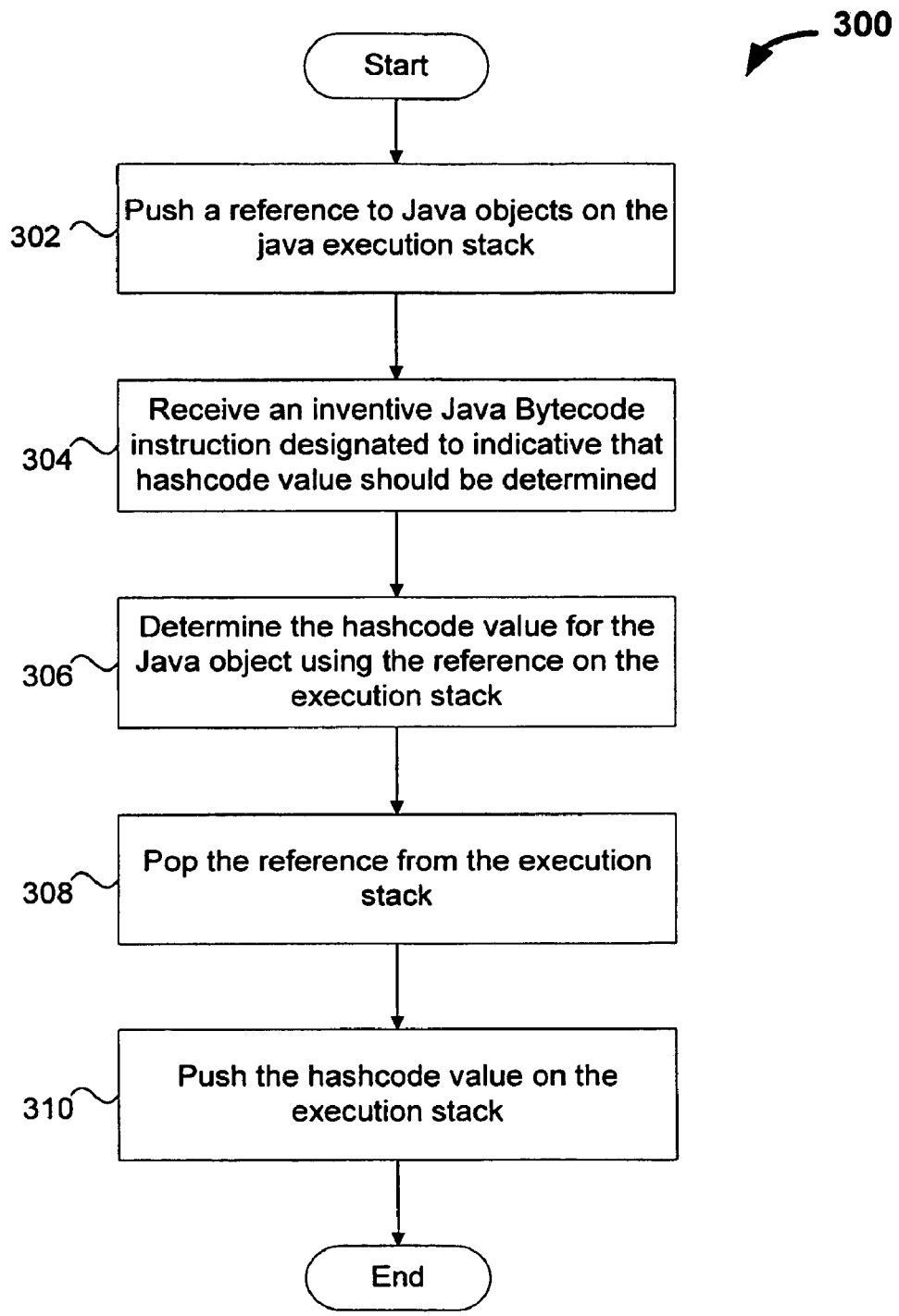
FIG. 3 illustrates a method of determining hashcode values for Java objects.

FIG. 3 illustrates a method 300 for determining hashcode values for Java objects. The method 300 can be implemented by a virtual machine operating in a Java computing environment. Initially, at operation 302, a reference to a Java object is pushed on the execution stack. Next, at operation 304, an inventive Java Bytecode operation is received. The inventive Java Bytecode operation is designated to indicate that the hashcode value associated with the Java object should be determined. Accordingly, at operation 306, the hashcode value for the Java object is determined using the reference on the execution stack. Thereafter, at operation 308, the reference is popped from the stack. Finally, at operation 310, the hashcode value is pushed on the top of the execution stack.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer readable medium for storing a Java Bytecode instruction for determining a hashcode value for a Java object, wherein said hashcode value uniquely identifies said Java object among all other Java objects in said Java computing environment, and said Java Bytecode instruction is suitable for execution by a Java virtual machine in a Java computing environment, wherein said Java Bytecode instruction when interpreted at runtime by said virtual machine operates to determine and store, a hashcode value for said Java object on an execution stack used by said virtual machine to interpret said Java Bytecode instruction, by accessing a field of said Java object which stores said hashcode value for said Java object, thereby allowing said virtual machine to determine said hashcode value for said java object without invoking a Java method;
wherein said Java Bytecode instruction when executed further operates to:
  pop a reference to said Java object from the top of an execution stack when said Bytecode instruction is executed;
  determine a hashcode for said Java object by accessing the field of said Java object after said reference has been popped; and
  push said hashcode on top of said execution stack after said hashcode has been calculated.

2. A Java Bytecode instruction as recited in claim 1, wherein said Java Bytecode instruction is executed in an embedded system.

3. A Java virtual machine operating in a Java computing environment, wherein said Java virtual machine is capable of determining hashcode values for one or more Java objects wherein each of said one or more hashcode values uniquely identifies a Java object among all other Java objects in said Java computing environment and said one or more hashcode values are determined by executing a Bytecode instruction for determining hashcode values which when interpreted by said Java virtual machine operates to determine and store, a hashcode value for a Java object on an execution stack used by said virtual machine, by accessing a field of said Java object which provides said hashcode for said Java object, thereby allowing said hashcode value for said java object to be determined by said virtual machine without invoking a Java method;
wherein said Java Bytecode instruction when executed further operates to:
  pop a reference to said Java object from the top of an execution stack when said Bytecode instruction is executed;
  determine a hashcode for said Java object by accessing the field of said Java object after said reference has been popped; and
  push said hashcode on top of said execution stack after said hashcode has been calculated.

4. A Java virtual machine as recited in claim 3, wherein said Java virtual machine operates in an embedded system.

5. A method as recited in claim 4, wherein said method further comprises:
  pushing a reference to said Java object on said execution stack.

6. A method as recited in claim 3, wherein said virtual machine operates in a mobile or handheld device.

7. In a Java computing environment, a computer implemented method of determining hashcode values for Java objects, said method comprising:
  receiving a Java Bytecode instruction in a stream of Java Bytecodes suitable for execution by a virtual machine operating in said Java computing environment, wherein said Java Bytecode instruction is designated as a determining hashcode instruction that operates to determine a hashcode value for a Java object, wherein said hashcode value uniquely identifies a Java object among other Java objects in said java computing environment; and
  interpreting at runtime said Java Bydecode instruction after said Java Bytecode is received, wherein said interpreting comprises accessing a field of said Java object which stores a hashcode value for said Java object and storing said hashcode value on an execution stack used for interpreting said stream of Java Bvtecodes; thereby determining said hashcode value without invoking a Java hashcode method;
wherein said method further comprises:
  popping a reference to a Java object from an execution stack;
  calculating a hashcode value for said Java object by accessing said field of said Java object which provides said hashcode value for said Java object; and
  pushing said hashcode value on said execution stack.

8. A method as recited in claim 7, wherein said pushing of a reference to said Java object is performed by execution of a Java Aload execution.

9. A method as recited in claim 8, wherein said method is performed by a virtual machine.

10. A method as recited in claim 9, wherein said virtual machine is operating in an embedded system.

11. A computer readable media including computer program code for determining hashcode values for Java objects, said compute readable media comprising:
  computer program code for receiving a Java Bytecode instruction in a stream of Java Bytecodes suitable for execution by a virtual machine operating in a Java computing environment, wherein said Java Bytecode instruction is designated as a determining hashcode instruction that operates to determine a hashcode value wherein said hashcode value uniquely identifies a Java object among all other Java objects in said Java computing environment; and
  executing said Java Bytecode instruction after said Java Bvtecode is received, wherein said executing comprises accessing a field of said Java object which stores a hashcode value for said object and storing said hashcode value on an execution stack used to execute said stream of Java Bvtecodes, thereby determining said hashcode value for said Java object without invoking a Java method;

wherein said computer readable media further comprises;
    computer program code for popping a reference to a Java object from an execution stack;
    computer program code for calculating a hashcode value for said Java object value by accessing said field of said Java object which provides said hashcode value for said Java object; and
    computer program code for pushing said hashcode value on said execution stack.

12. A computer readable media as recited in claim 11, wherein said computer readable media further comprises:
    computer program code for pushing a reference to said Java object on said execution stack.

13. A computer readable media as recited in claim 11, wherein said computer program code for pushing said reference is performed by a Java Aload execution.

14. A computor readable media as recited in claim 13, wherein said computor readable media is read by a Java virtual machine.

15. A computor readable media as recited in claim 14, wherein said virtual machine is operating in an embedded system.

* * * * *

UNITED STATES PATENT AND TRADEMARK OFFICE
CERTIFICATE OF CORRECTION

PATENT NO. : 7,197,750 B2
APPLICATION NO. : 09/896016
DATED : March 27, 2007
INVENTOR(S) : David Wallman and Stepan Sokolov It is certified that error appears in the above-identified patent and that said Letters Patent is hereby corrected as shown below:

In column 8, at line 5, delete "computor" and insert --computer--.

In column 8, at line 6, delete "computor" and insert --computer--.

In column 8, at line 9, delete "computor" and insert --computer--.

Signed and Sealed this

Twenty-ninth Day of May, 2007

JON W. DUDAS
*Director of the United States Patent and Trademark Office*